(12) United States Patent
Huang

(10) Patent No.: US 10,777,372 B2
(45) Date of Patent: Sep. 15, 2020

(54) TOUCHPAD MODULE AND COMPUTING DEVICE USING SAME

(71) Applicant: PRIMAX ELECTRONICS LTD., Taipei (TW)

(72) Inventor: Tai-Sou Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/360,748

(22) Filed: Mar. 21, 2019

(65) Prior Publication Data
US 2020/0203100 A1    Jun. 25, 2020

(30) Foreign Application Priority Data
Dec. 19, 2018    (TW) .............................. 107145950 A

(51) Int. Cl.
| | | |
|---|---|---|
| G09G 5/00 | (2006.01) | |
| H01H 21/24 | (2006.01) | |
| H01H 21/86 | (2006.01) | |
| H01H 21/12 | (2006.01) | |
| G06F 3/0354 | (2013.01) | |
| G06F 1/16 | (2006.01) | |
| H01H 21/04 | (2006.01) | |

(52) U.S. Cl.
CPC .............. *H01H 21/24* (2013.01); *G06F 1/169* (2013.01); *G06F 3/03547* (2013.01); *H01H 21/12* (2013.01); *H01H 21/86* (2013.01); *H01H 21/04* (2013.01); *H01H 2201/032* (2013.01)

(58) Field of Classification Search
CPC ........ H01H 21/24; H01H 21/12; H01H 21/86; H01H 2201/032; H01H 21/04; G06F 3/03547; G06F 1/169
See application file for complete search history.

(56) References Cited

U.S. PATENT DOCUMENTS

| | | | | |
|---|---|---|---|---|
| 6,313,731 | B1 * | 11/2001 | Vance | ..................... H01H 13/70 |
| | | | | 200/5 A |
| 2006/0284836 | A1 * | 12/2006 | Philipp | .................... G06F 3/044 |
| | | | | 345/156 |
| 2008/0202824 | A1 * | 8/2008 | Philipp | ..................... G06F 3/02 |
| | | | | 178/18.01 |

* cited by examiner

*Primary Examiner* — Adam R. Giesy
(74) *Attorney, Agent, or Firm* — WPAT, PC

(57) ABSTRACT

A touchpad module includes a circuit board and a switch assembly. The switch element includes a conductive element and a metal dome. The conductive element is capable of providing buffering efficacy. The conductive element is arranged between the circuit board and the metal dome. When the metal dome is subjected to deformation, the metal dome does not collide with the circuit board to generate the click sound directly. Consequently, the comfort of operating the touchpad module is enhanced. The present invention further provides a computing device with the touchpad module.

18 Claims, 10 Drawing Sheets

TOUCHPAD MODULE AND COMPUTING DEVICE USING SAME

FIELD OF THE INVENTION

The present invention relates to an input device, and more particularly to an input device with a touch control function.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The common electronic devices include for example notebook computers, mobile phones, satellite navigation devices, or the like. Recently, the storage capacity and the processor's computing performance for these electronic devices are largely enhanced, and thus their functions become more powerful and complicated. For efficiently operating an electronic device, a touchpad is used as an input device of the electronic device for controlling the operations of the electronic device.

FIG. 1 schematically illustrates a conventional notebook computer with a touchpad module. As shown in FIG. 1, the touchpad module 1 is installed on a casing 21 of the notebook computer 2. Moreover, at least a portion of the touchpad module 1 is exposed outside so as to be touched by the user's finger. Consequently, the user may operate the touchpad module 1 to control the notebook computer 2. For example, in case that the user's finger is placed on the touchpad module 1 and slid on the touchpad module 1, a cursor 23 shown on a display screen 22 of the notebook computer 2 is correspondingly moved. Moreover, in case that the touchpad module 1 is pressed down by the user's finger, the notebook computer 2 executes a specified function. The use of the touchpad module 1 can implement some functions of the conventional mouse. In other words, the user may operate the notebook computer 2 through the touchpad module 1 without the need of additionally carrying or installing the mouse.

FIG. 2 is a schematic cross-sectional view illustrating the touchpad module as shown in FIG. 1, in which the touchpad module is not pressed down. FIG. 3 is a schematic cross-sectional view illustrating the touchpad module as shown in FIG. 2, in which the touchpad module is pressed down. FIG. 4 is a schematic cross-sectional view illustrating portions of a circuit board and a switch element of the touchpad module as shown in FIG. 1. As shown in FIGS. 2, 3 and 4, a fixing frame 24 is concavely formed in the casing 21 of the notebook computer 2. A supporting structure 241 and a triggering part 242 are respectively protruded from two opposite sides of an inner wall of the fixing frame 24. A first end 11 of the touchpad module 1 is connected with the supporting structure 241. Consequently, a second end 12 of the touchpad module 1 may be swung relative to the triggering part 242 by using the supporting structure 241 as a fulcrum.

The touchpad module 1 further comprises a switch element 13 and a circuit board 14. The switch element 13 is located under the second end 12 of the touchpad module 1 and aligned with the triggering part 242. The switch element 13 comprises a metal dome 131. A first conducting part 141 and a second conducting part 142 corresponding to the metal dome 131 are disposed on the circuit board 14. The first conducting part 141 and the second conducting part 142 are separated from each other by a gap. When the touchpad module 1 is not pressed down, the metal dome 131 is not subjected to deformation. Meanwhile, as shown in FIG. 4, the metal dome 131 is contacted with the first conducting part 141 but not contacted with the second conducting part 142.

While the touchpad module 1 is pressed down by the user, the second end 12 of the touchpad module 1 is swung downwardly relative to the triggering part 242 by using the supporting structure 241 as a fulcrum. When the switch element 13 of the touchpad module 1 is pushed by the triggering part 242 of the fixing frame 24, the metal dome 131 is subjected to deformation. At the same time, the metal dome 131 is contacted with both of the first conducting part 141 and the second conducting part 142, and the electric connection between the first conducting part 141 and the second conducting part 142 is established. Under this circumstance, the switch element 13 is triggered to generate a switch signal to the notebook computer 2. According to the switch signal, the notebook computer 2 executes a corresponding function. When the touchpad module 1 is no longer pressed by the user, the second end 12 of the touchpad module 1 is swung upwardly relative to the triggering part 242 in response to the elastic force of the metal dome 131 and/or the elastic force of the supporting structure 241. Consequently, the metal dome 131 is restored to its original shape (see FIG. 4) and the touchpad module 1 is returned to its original position.

However, the conventional touchpad module 1 still has some drawbacks. For example, while the touchpad module 1 is pressed down by the user, unpleasant noise is generated. The source of the noise includes the click sound in response to the collision between the switch element 13 and the triggering part 242 and the click sound in response to the collision between the deformed metal dome 131 and the second conducting part 142. For solving this problem, some other touchpad modules have been disclosed. In accordance with a conventional touchpad module, a rubber element (not shown) is disposed on the triggering part 242 to alleviate the collision between the switch element 13 and the triggering part 242. In accordance with another conventional touchpad module, a rubber cover is sheathed around the switch element 13. Due to the rubber cover, the click sound inside the touchpad module is blocked from being outputted from the touchpad module. However, regardless of whether the rubber element is installed on the triggering part 242 or the rubber cover is sheathed around the switch element 13, the efficacy of reducing the noise is limited. In other words, the touchpad module needs to be further improved.

SUMMARY OF THE INVENTION

An object of the present invention provides a touchpad module. A conductive element capable of providing buffering efficacy is arranged between a circuit board and a metal dome of the touchpad module. When the metal dome is subjected to deformation, the metal dome does not collide with the circuit board to generate the click sound directly. Consequently, the comfort of operating the touchpad module is enhanced.

Another object of the present invention provides a computing device with the touchpad module.

In accordance with an aspect of the present invention, there is provided a touchpad module. The touchpad module includes a circuit board and a switch assembly. The circuit board includes a first contact part and a second contact part. There is a horizontal spacing distance between the first contact part and the second contact part. The switch assembly includes a first conductive element, a metal dome and a second conductive element. The first conductive element is located under the circuit board, and contacted with the first contact part. The first conductive element has an opening. The second conductive element is arranged between the metal dome and the first conductive element. There is a vertical spacing distance between the second conductive element and the second contact part. When the touchpad module is pressed down and the switch assembly is moved downwardly to push a triggering part, the metal dome is subjected to deformation and contacted with the second conductive element, and at least a portion of the second conductive element is penetrated through the opening and contacted with the second contact part. Consequently, the first contact part and the second contact part are electrically connected with each other.

In accordance with another aspect of the present invention, there is provided a computing device. The computing device includes a casing, a processor and a touchpad module. A fixing frame is concavely formed in the casing. The processor is disposed within the casing. The touchpad module is disposed within the fixing frame and electrically connected with the processor. The touchpad module includes a circuit board and a switch assembly. The circuit board includes a first contact part and a second contact part. There is a horizontal spacing distance between the first contact part and the second contact part. The switch assembly includes a first conductive element, a metal dome and a second conductive element. The first conductive element is located under the circuit board, and contacted with the first contact part. The first conductive element has an opening. The second conductive element is arranged between the metal dome and the first conductive element. There is a vertical spacing distance between the second conductive element and the second contact part. When the touchpad module is pressed down and the switch assembly is moved downwardly to push a triggering part, the metal dome is subjected to deformation and contacted with the second conductive element, and at least a portion of the second conductive element is penetrated through the opening and contacted with the second contact part. Consequently, the first contact part and the second contact part are electrically connected with each other.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
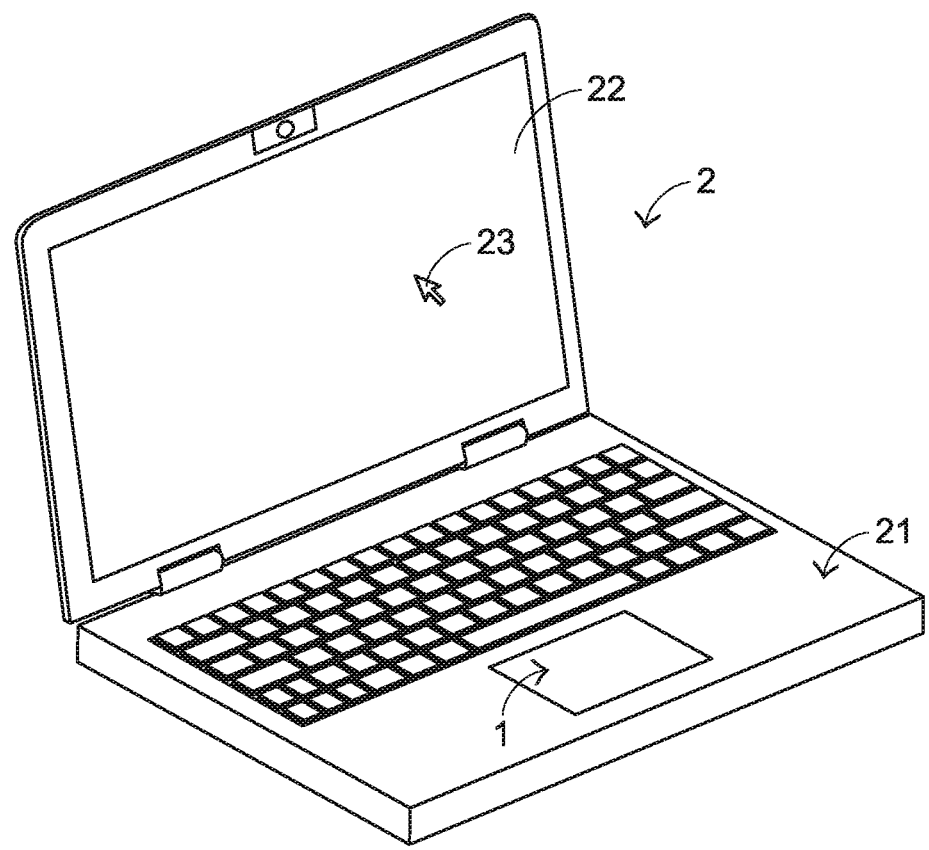
FIG. 1 schematically illustrates a conventional notebook computer with a touchpad module.
Figure 2:
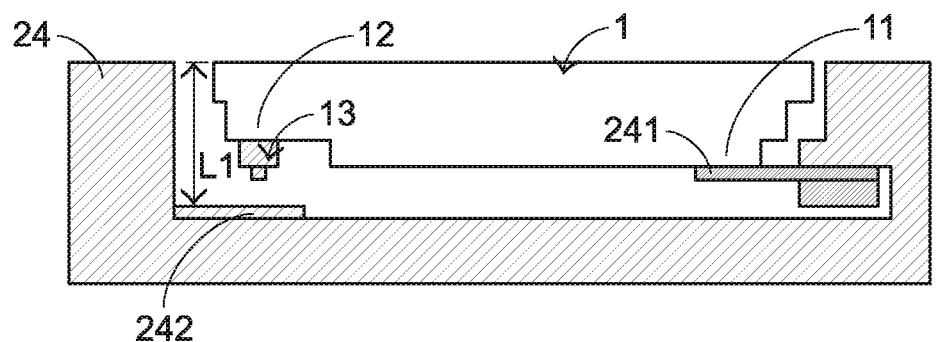
FIG. 2 is a schematic cross-sectional view illustrating the touchpad module as shown in FIG. 1, in which the touchpad module is not pressed down.
Figure 3:
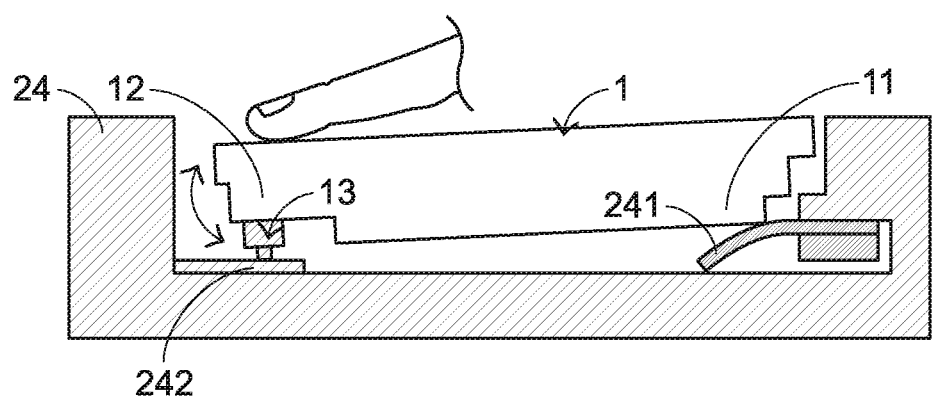
FIG. 3 is a schematic cross-sectional view illustrating the touchpad module as shown in FIG. 2, in which the touchpad module is pressed down.
Figure 4:
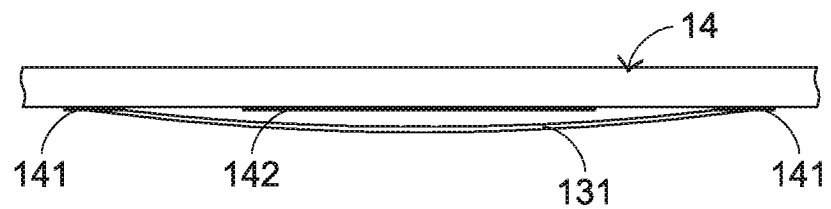
FIG. 4 is a schematic cross-sectional view illustrating portions of a circuit board and a switch element of the touchpad module as shown in FIG. 1.
Figure 5:
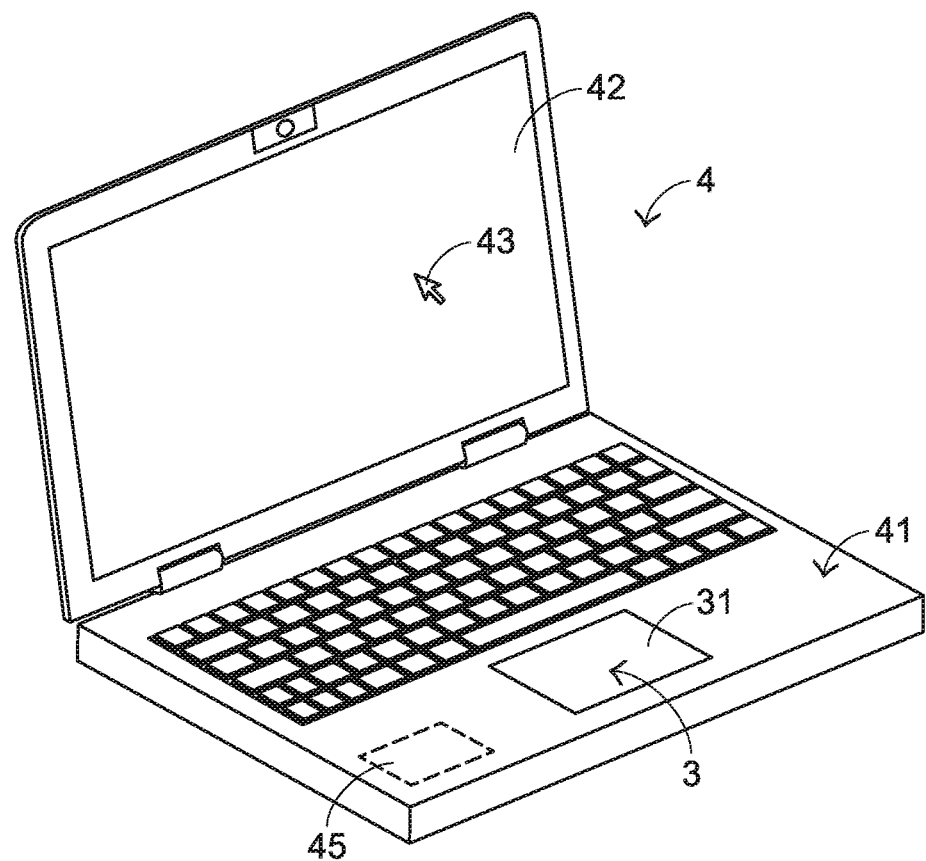
FIG. 5 is a schematic perspective view illustrating the outer appearance of a computing device with a touchpad module according to an embodiment of the present invention.

FIG. 5 is a schematic perspective view illustrating the outer appearance of a computing device with a touchpad module according to an embodiment of the present invention. An example of the computing device 4 includes but is not limited to a notebook computer. In an embodiment, the computing device 4 comprises a casing 41, a display screen 42, a processor 45 and a touchpad module 3. The processor 45 is disposed within the casing 41. Moreover, the processor 45 is used for processing electronic signals of the computing device 4. Moreover, a fixing frame 44 is concavely formed in the casing 41 (see FIG. 6). The touchpad module 3 is disposed within the fixing frame 44 and electrically connected with the processor 45. In addition, at least a portion of the touchpad module 3 is exposed outside so as to be touched by the user's finger. Consequently, the user may operate the touchpad module 3 to control the computing device 4. For example, in case that the user's finger is placed on the touchpad module 3 and slid on the touchpad module 3, a cursor 43 shown on the display screen 42 is correspondingly moved. Moreover, in case that the touchpad module 3 is pressed by the user's finger, the computing device 4 executes a specified function.

Figure 6:
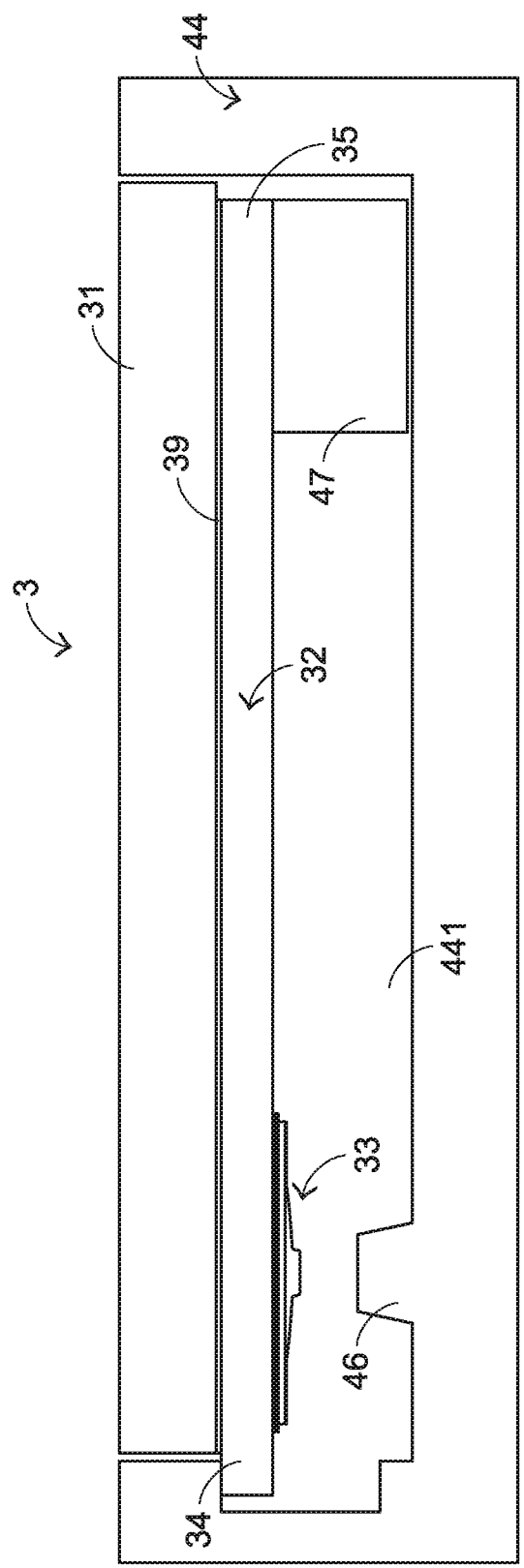
FIG. 6 is a schematic side view illustrating portions of a fixing frame and the touchpad module of the computing device as shown in FIG. 5.

FIG. 6 is a schematic side view illustrating portions of a fixing frame and a touchpad module of the computing device as shown in FIG. 5. The fixing frame 44 of the computing device 4 comprises an accommodation space 441. The touchpad module 3 is accommodated within the accommodation space 441. From top to bottom, the touchpad module 3 comprises a covering plate 31, an adhesive layer 39, a circuit board 32 and a switch assembly 33. The covering plate 31 and the circuit board 32 are combined together through the adhesive layer 39. The switch assembly 33 is disposed on a bottom surface of the circuit board 32 and located at a first end 34 of the touchpad module 3. The circuit board 32 comprises a first contact part 321 and a second contact part 322. The first contact part 321 and the second contact part 322 are spaced from each other, and there is a horizontal spacing distance between the first contact part 321 and the second contact part 322 (see FIG. 7). The first contact part 321 and the second contact part 322 are electrically connected with the switch assembly 33.

A top surface of the covering plate 31 is exposed outside. Consequently, the covering plate 31 can be touched and operated by the user. When the circuit board 32 senses the touching and operating behavior of the user on the covering plate 31, the circuit board 32 issues a corresponding electronic signal. According to the electronic signal, the computing device 4 executes a corresponding command. In this embodiment, the first contact part 321 and the second contact part 322 of the circuit board 32 are concentrically arranged on the bottom surface of the circuit board 32. Preferably but not exclusively, the covering plate 31 is a glass covering plate or a plastic covering plate, and the adhesive layer 39 is made of a pressure sensitive adhesive (PSA).

The computing device 4 further comprises a triggering part 46 and a supporting structure 47. The triggering part 46 and the supporting structure 47 are disposed on an inner side of the fixing frame 44 and accommodated within the accommodation space 441 of the fixing frame 44. A second end 35 of the touchpad module 3 is disposed on the supporting structure 47. During the process of swinging the first end 34 of the touchpad module 3, the second end 35 of the touchpad module 3 is used as a fulcrum. The triggering part 46 is aligned with the switch assembly 33. While the first end 34 of the touchpad module 3 is swung downwardly, the triggering part 46 is contacted with the switch assembly 33. The triggering part 46 is a raised structure or a flat surface. In addition, the triggering part 46 is integrally formed with the fixing frame 44. Alternatively, the triggering part 46 is one of the components within the fixing frame 44.

Figure 7:
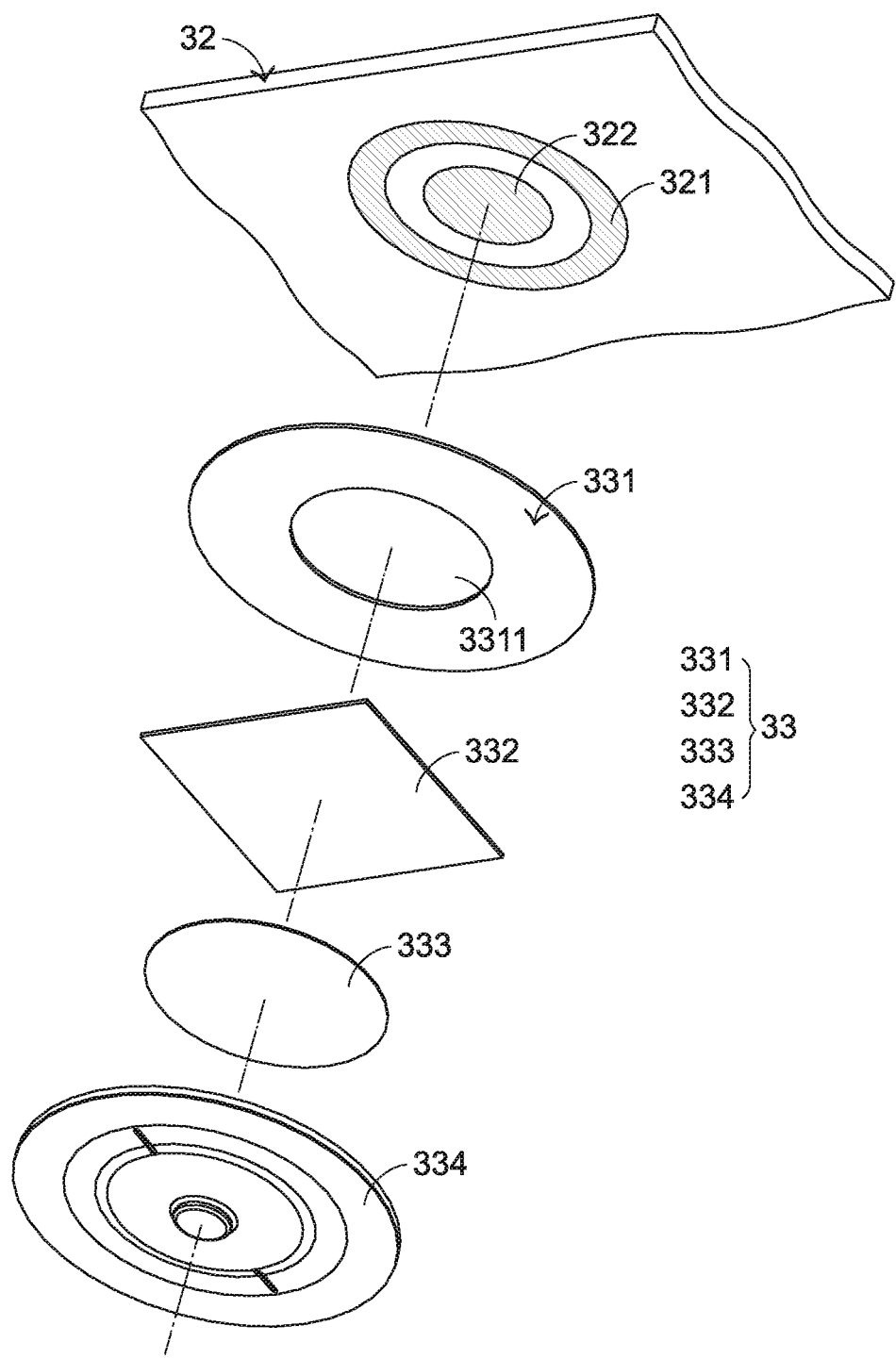
FIG. 7 is a schematic exploded view illustrating a portion of a switch assembly of the touchpad module as shown in FIG. 6 and taken along a viewpoint.
Figure 8:
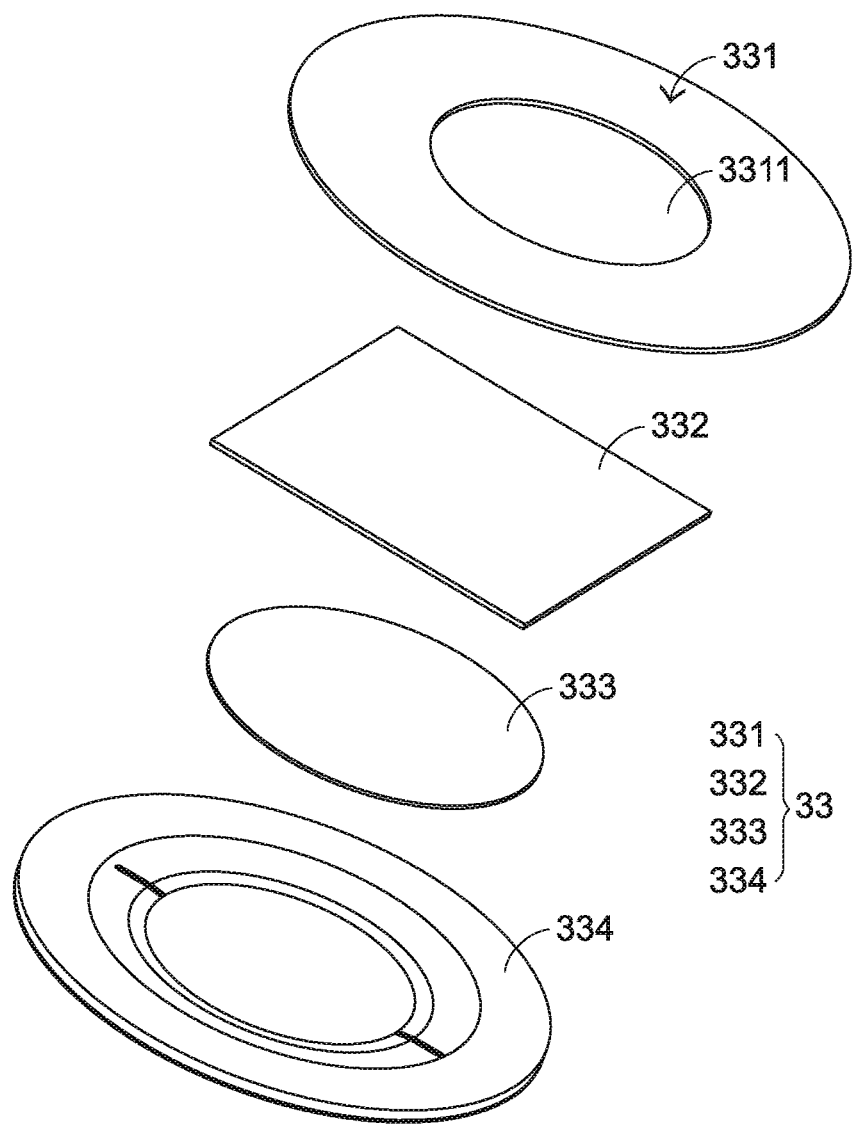
FIG. 8 is a schematic exploded view illustrating a portion of the switch assembly of the touchpad module as shown in FIG. 6 and taken along another viewpoint.
Figure 9:
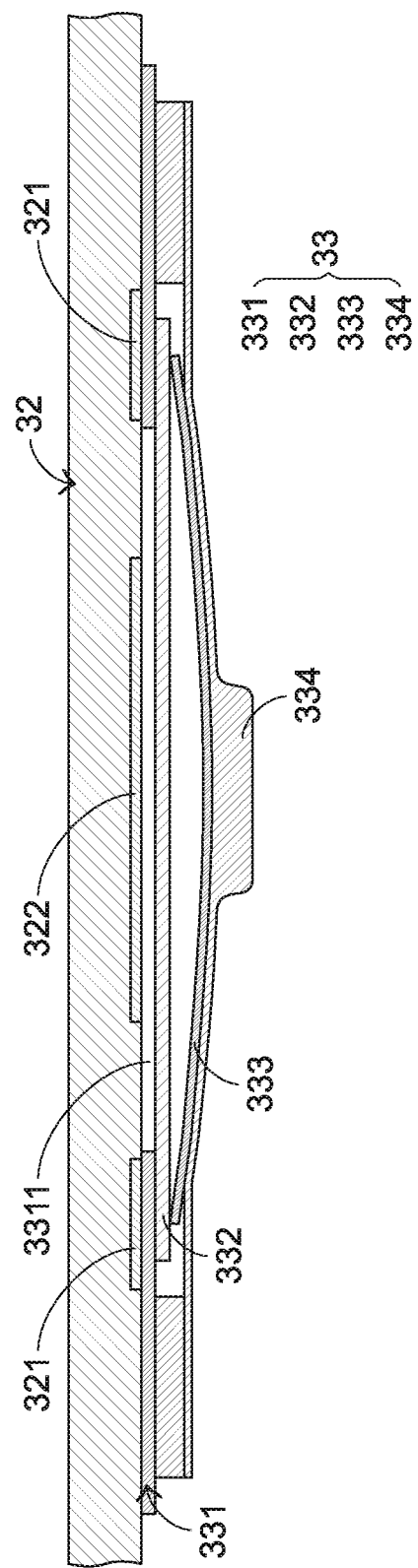
FIG. 9 is a schematic cross-sectional view illustrating a portion of the touchpad module as shown in FIG. 7.

Please refer to FIGS. 7, 8 and 9. FIG. 7 is a schematic exploded view illustrating a portion of a switch assembly of the touchpad module as shown in FIG. 6 and taken along a viewpoint. FIG. 8 is a schematic exploded view illustrating a portion of the switch assembly of the touchpad module as shown in FIG. 6 and taken along another viewpoint. FIG. 9 is a schematic cross-sectional view illustrating a portion of the touchpad module as shown in FIG. 7. The switch assembly 33 comprises a first conductive element 331, a second conductive element 332, a metal dome 333 and a sheltering plate 334. The first conductive element 331 has an opening 3311. Moreover, the first conductive element 331 is located under the circuit board 32 and contacted with the first contact part 321. The second conductive element 332 is arranged between the metal dome 333 and the first conductive element 331. The metal dome 333 and the second conductive element 332 are covered between the sheltering plate 334 and the first conductive element 331. Since the second conductive element 332 and the second contact part 322 of the circuit board 32 are separated from each other by the first conductive element 331, there is a first vertical spacing distance between the second conductive element 332 and the second contact part 322. When the touchpad module 3 is not pressed, only the portion of the metal dome 333 perpendicularly aligned with the first contact part 321 is contacted with the second conductive element 332, and the portion of the metal dome 333 perpendicularly aligned with the second contact part 322 is separated from the second conductive element 332 by a second vertical spacing distance (see FIG. 9).

In an embodiment, the first conductive element 331 has a ring-shaped disc structure that is made of conductive copper foil or conductive cloth. The material of the first conductive element 331 is selected such that the first conductive element 331 is easily combined with the circuit board 32. The second conductive element 332 is made of elastic material (e.g., conductive rubber). The material of the second conductive element 332 is selected such that the second conductive element 332 provides the buffering and noise-reducing efficacy. The operating principle of providing the buffering and noise-reducing efficacy by the second conductive element 332 will be described later. The metal dome 333 is made of metallic material. Preferably but not exclusively, the sheltering plate 334 is made of plastic material or metallic material. It is noted that the materials and shapes of the first conductive element 331, the second conductive element 332, the metal dome 333 and the sheltering plate 334 are not restricted.

Figure 10:
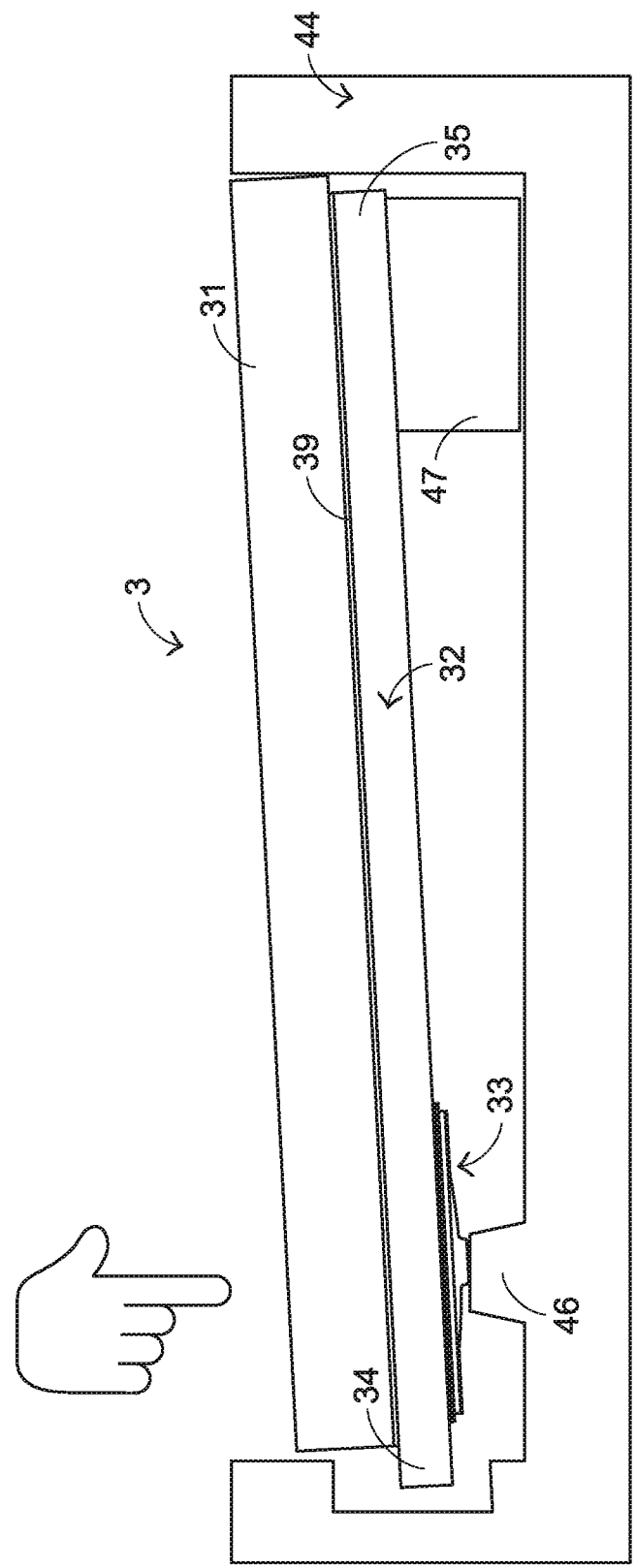
FIG. 10 is a schematic cross-sectional view illustrating the touchpad module as shown in FIG. 6, in which the touchpad module is pressed down.

Please refer to FIGS. 9 and 10. FIG. 10 is a schematic cross-sectional view illustrating the touchpad module as shown in FIG. 6, in which the touchpad module is pressed down. While the covering plate 31 of the touchpad module 3 is pressed down by the user, the first end 34 of the touchpad module 3 is swung downwardly relative to the triggering part 46 by using the supporting structure 47 as a fulcrum. When the switch assembly 33 is pushed by the triggering part 46, the metal dome 333 of the switch assembly 33 is subjected to deformation. While the metal dome 333 is subjected to deformation, the portion of the metal dome 333 perpendicularly aligned with the second contact part 322 of the circuit board 32 is moved upwardly to push the second conductive element 332. Consequently, a portion of the second conductive element 332 is penetrated upwardly through the opening 3311 of the first conductive element 331 and contacted with the second contact part 322 of the circuit board 32. Under this circumstance, the electric connection between the first contact part 321 and the second contact part 322 of the circuit board 32 is established through the first conductive element 331 and the second conductive element 332. Consequently, the circuit board 32 issues a corresponding electronic signal to the computing device 4. According to the electronic signal, the computing device 4 executes a corresponding function.

When the touchpad module 3 is no longer pressed by the user, the first end 34 of the touchpad module 3 is swung upwardly relative to the triggering part 46 in response to the elastic force of the metal dome 333 and/or the elastic force of the supporting structure 47. Consequently, the metal dome 333 is restored to its original shape (see FIG. 9) and the touchpad module 3 is returned to its original position.

As mentioned above, the switch assembly 33 of the touchpad module 3 is specially designed. The second conductive element 332 arranged between the second contact part 322 of the circuit board 32 and the metal dome 333 can provide the buffering efficacy. The second conductive element 332 and the second contact part 322 of the circuit board 32 are separated from each other by the first conductive element 331 along the vertical direction. That is, when the metal dome 333 is subjected to deformation, the metal dome 333 does not collide with the second contact part 322 of the circuit board 32 to generate the click sound directly. Consequently, the comfort of operating the touchpad module 3 is enhanced.

In the above embodiment, the portion of the metal dome 333 perpendicularly aligned with the first contact part 321 is contacted with the second conductive element 332 when the touchpad module 3 is not pressed down. It is noted that numerous modifications and alterations may be made while retaining the teachings of the invention. In a variant example, the portion of the metal dome 333 perpendicularly aligned with the first contact part 321 is not contacted with the second conductive element 332 when the touchpad module 3 is not pressed down. When the covering plate 31 is pressed down and the metal dome 333 is subjected to deformation, the portion of the metal dome 333 perpendicularly aligned with the first contact part 321 is contacted with the second conductive element 332.

Figure 11:
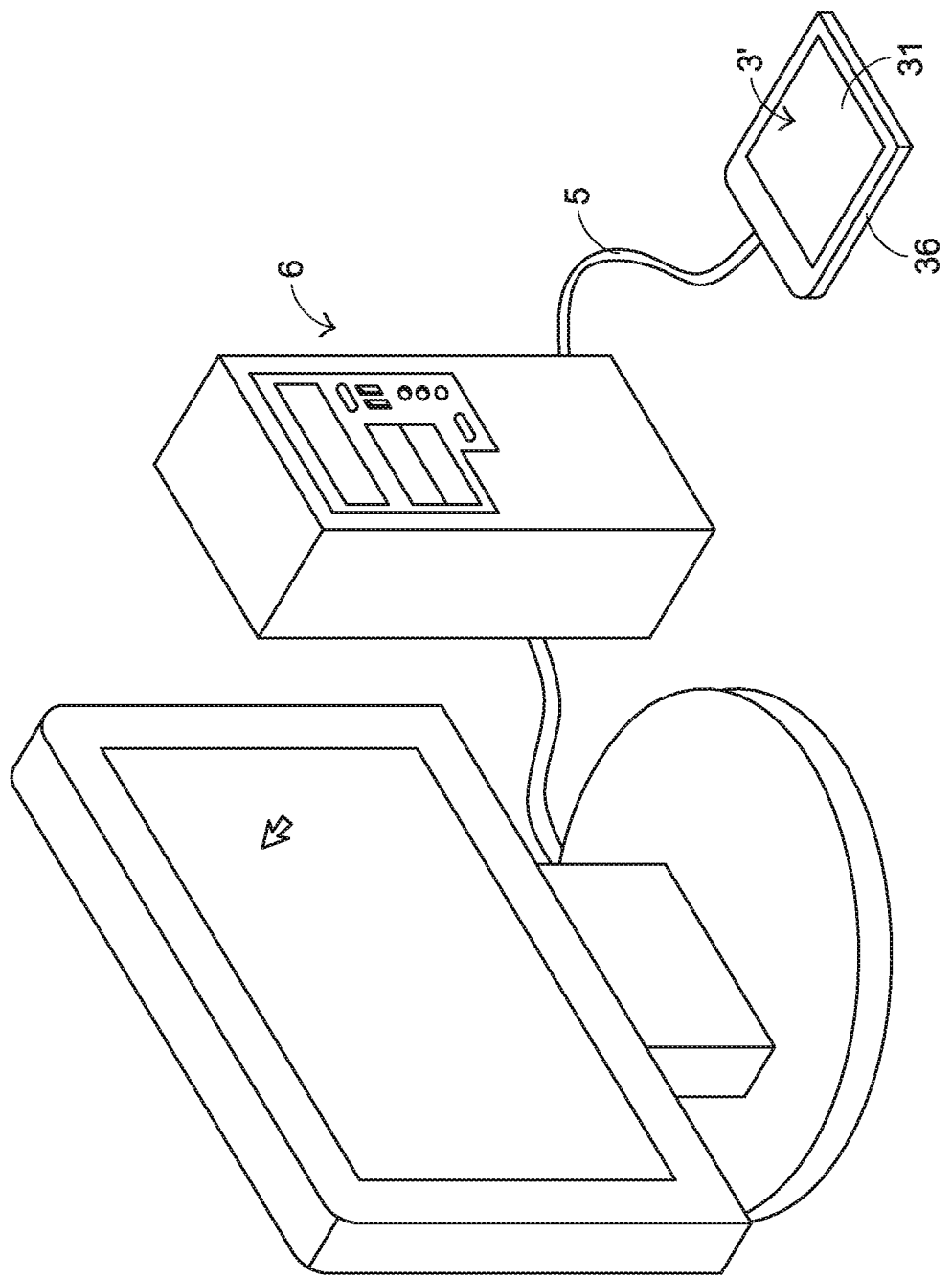
FIG. 11 schematically illustrates a touchpad module for a computing device according to another embodiment of the present invention.
Figure 12:
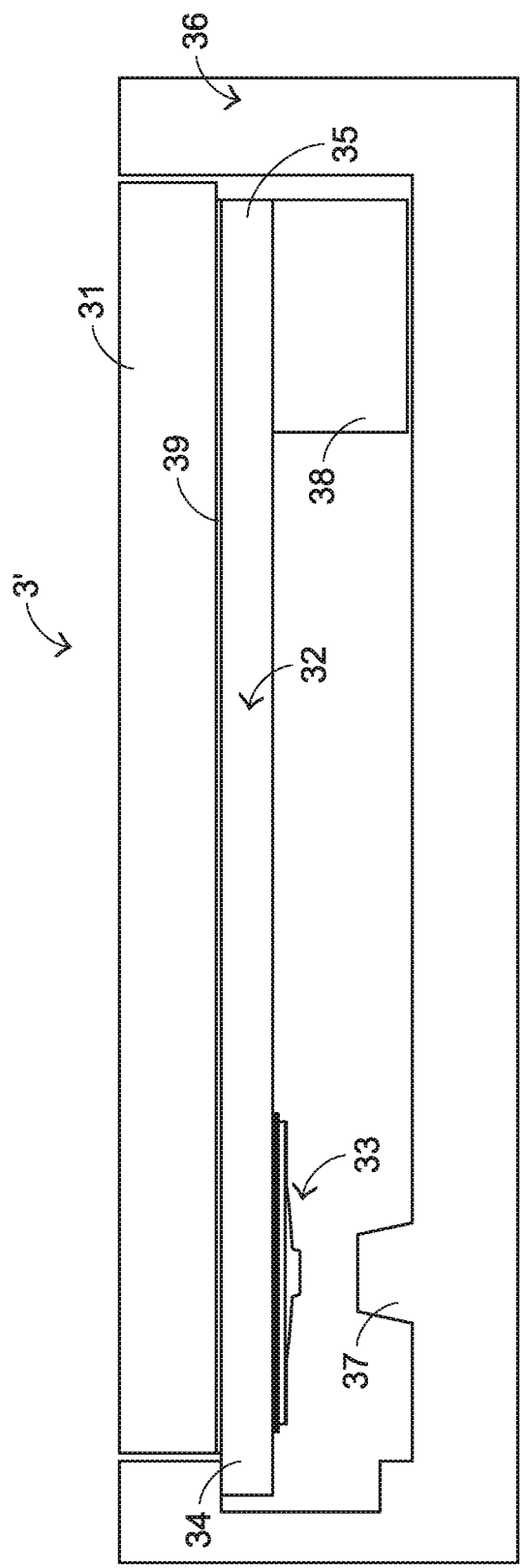
FIG. 12 is a schematic cross-sectional view illustrating a portion of the touchpad module as shown in FIG. 11.

In another embodiment, the touchpad module is an external input device that is independent from the electronic computing device. Please refer to FIGS. 11 and 12. FIG. 11 schematically illustrates a touchpad module for a computing device according to another embodiment of the present invention. FIG. 12 is a schematic cross-sectional view illustrating a portion of the touchpad module as shown in FIG. 11. The structures and functions of the components of the touchpad module 3' which are identical to those of the above embodiments are not redundantly described herein. The touchpad module 3' further comprises a triggering part 37, a supporting structure 38 and a fixing frame 36. The covering plate 31, the adhesive layer 39, the circuit board 32 and the switch assembly 33 are accommodated within the fixing frame 36. The triggering part 37 is a raised structure or a flat surface. In addition, the triggering part 37 is integrally formed with the fixing frame 36. Alternatively, the triggering part 37 is one of the components within the fixing frame 36. The touchpad module 3' is in communication with a desktop computer 6 through a universal serial bus (USB) 5.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touchpad module, comprising:
   a circuit board comprising a first contact part and a second contact part, wherein there is a horizontal spacing distance between the first contact part and the second contact part; and
   a switch assembly comprising:
      a first conductive element located under the circuit board, and contacted with the first contact part, wherein the first conductive element has an opening, and the first conductive element is made of conductive copper foil or conductive cloth;
      a metal dome; and
      a second conductive element arranged between the metal dome and the first conductive element, wherein there is a vertical spacing distance between the second conductive element and the second contact part,
      wherein when the touchpad module is pressed down and the switch assembly is moved downwardly to push a triggering part, the metal dome is subjected to deformation and contacted with the second conductive element, and at least a portion of the second conductive element is penetrated through the opening and contacted with the second contact part, so that the first contact part and the second contact part are electrically connected with each other.

2. The touchpad module according to claim 1, wherein the second conductive element is made of elastic material.

3. The touchpad module according to claim 2, wherein the elastic material is conductive rubber.

4. The touchpad module according to claim 1, wherein the first conductive element has a ring-shaped disc structure.

5. The touchpad module according to claim 1, wherein the first contact part and the second contact part are concentrically arranged on the circuit board.

6. The touchpad module according to claim 1, wherein the touchpad module further comprises a covering plate, and the covering plate is located over the circuit board.

7. The touchpad module according to claim 6, wherein the covering plate is a glass covering plate or a plastic covering plate, and the covering plate and the circuit board are combined together through an adhesive layer.

8. The touchpad module according to claim 1, wherein the switch assembly further comprises a sheltering plate, wherein the metal dome and the second conductive element are covered between the sheltering plate and the first conductive element.

9. The touchpad module according to claim 1, wherein the touchpad module is accommodated within a fixing frame, and the triggering part is disposed on an inner surface of the fixing frame so as to be pushed by the switch assembly.

10. The touchpad module according to claim 9, wherein the fixing frame is included in a computing device, or the touchpad module further comprises the fixing frame.

11. A computing device, comprising:
    a casing, wherein a fixing frame is concavely formed in the casing;
    a processor disposed within the casing; and
    a touchpad module disposed within the fixing frame and electrically connected with the processor, wherein the touchpad module comprises a circuit board and a switch assembly, wherein the circuit board comprises a first contact part and a second contact part, and there is a horizontal spacing distance between the first contact part and the second contact part, wherein the switch assembly comprises:
       a first conductive element located under the circuit board, and contacted with the first contact part, wherein the first conductive element has an opening, and the first conductive element is made of conductive copper foil or conductive cloth;
       a metal dome; and
       a second conductive element arranged between the metal dome and the first conductive element, wherein there is a vertical spacing distance between the second conductive element and the second contact part,
       wherein when the touchpad module is pressed down and the switch assembly is moved downwardly to push a triggering part, the metal dome is subjected to deformation and contacted with the second conductive element, and at least a portion of the second conductive element is penetrated through the opening and contacted with the second contact part, so that the first contact part and the second contact part are electrically connected with each other.

12. The computing device according to claim 11, wherein the second conductive element is made of elastic material.

13. The computing device according to claim 12, wherein the elastic material is conductive rubber.

14. The computing device according to claim 11, wherein the first conductive element has a ring-shaped disc structure.

15. The computing device according to claim 11, wherein the touchpad module further comprises a covering plate, and the covering plate is located over the circuit board.

16. The computing device according to claim 15, wherein the covering plate is a glass covering plate or a plastic covering plate, and the covering plate and the circuit board are combined together through an adhesive layer.

17. The computing device according to claim 11, wherein the switch assembly further comprises a sheltering plate, wherein the metal dome and the second conductive element are covered between the sheltering plate and the first conductive element.

18. The computing device according to claim 11, wherein the fixing frame comprises an accommodation space and the triggering part, wherein the triggering part is disposed on an inner surface of the fixing frame, and the touchpad module is accommodated within the accommodation space.

* * * * *